United States Patent Office 3,291,725
Patented Dec. 13, 1966

3,291,725
METHOD OF SEPARATING NORMAL ALKANES
John J. Brodbeck, Albany, Calif., assignor to Chevron Research Company, a corporation of Delaware
No Drawing. Filed Nov. 6, 1963, Ser. No. 321,669
9 Claims. (Cl. 208—310)

This invention concerns an improved process for the isolation of normal alkanes of at least 10 carbons. More particularly, this invention concerns the use of molecular sieves in a vapor phase process to obtain high purity normal alkanes of at least 10 carbons.

Molecular sieves have found wide applicability for separating molecules of different molecular geometry or cross-section. The common solid sorbents used as molecular sieves are dehydrated zeolites, synthetically fabricated from metallo-aluminum silicates, which, by virtue of such dehydration, contain extremely small pores. For use in isolation of normal alkanes, pore diameters of from about 4.9 to about 5.5 angstrom units are obtained. The size of the pores in the zeolites is such that when a solid sorbent of this type, in the form of a finely divided powder or in granular particles is contacted with a mixture of hydrocarbons, having both straight-chain or normal structure and branched-chain or iso or cyclic structure, only those compounds which have straight-chain configuration will be occluded within the internal structure of the solid adsorbent particles.

Particularly suitable solid sorbents are the dehydrated aluminum silicates of the bivalent metals, such as the alkali earth metals, for example, calcium aluminum silicates containing various calcium to aluminum to silicate ratios, the magnesium aluminum silicates, the barium aluminum silicates and the strontium aluminum silicates, or other bivalent metallo-aluminum silicate derivatives, such as the aluminum silicate derivatives of nickel, zinc, copper, cadmium and the like.

One of the preferred metallo-aluminum silicate solid sorbents particularly suitable for the separation of straight chain from other hydrocarbons is calcium aluminum silicate prepared, for example, by coprecipitating solutions of solid silicate and sodium aluminate to form a crystalline hydrated sodium-zeolite type aggregate, displacing at least some of the sodium with calcium in an ion exchange operation, and thereafter, dehydrating and activating the resulting composite by heating the same to a temperature above the boiling point of water, for example, to a temperature of from about 150° C. up to about 350° C.

Separating normal alkanes in a hydrocarbon mixture in the vapor phase has many advantages over liquid phase separation. Working with the vapor phase permits increased mass transfer rates and ease of movement of materials, as well as other advantages which have been discussed in the art and need not be exemplified here.

When working with the lower alkanes at atmospheric pressure, relatively low temperatures may be used to maintain the materials in the vapor phase. However, the alkanes which find use in the preparation of detergents are in the $C_{10}$–$C_{20}$ range. The alkanes which are employed to form alkylbenzene sulfonates are those of from about $C_{10}$–$C_{16}$, boiling in the range 380° F. to 565° F. at atmospheric pressure.

Many commercial uses for straight-chain alkanes have extremely stringent quality requirements. Low bromine numbers are essential, since olefins can lead to gums, as well as interfere with the use of alkanes as detergent precursors.

It has now been found that high purity normal alkanes can be efficiently separated from a petroleum distillate cut by contacting normal alkanes of from $C_{10}$–$C_{16}$ with molecular sieves in a relatively isothermal, and preferably isobaric, manner at temperatures in the range of about 500 to 600° F.—the temperature being high enough to maintain the hydrocarbons in the vapor phase—and pressures in the range of 0–100 p.s.i.g. for a time sufficient to partially fill the sieve with alkanes of from $C_{10}$–$C_{16}$, purging the sieve with lower alkanes of at least two carbons fewer than the number of carbons of the lowest desired alkane for a time sufficient to remove the non-adsorbed hydrocarbons present in the sieve, continuing the purge with the lower alkanes for a time sufficient to remove only a portion of the $C_{10}$–$C_{16}$ normal alkanes from the molecular sieve, and isolating the desired normal alkanes.

The feedstock used in the above process to obtain the normal alkanes is a petroleum cut boiling in the range of about 380 to 565° F. This cut includes the normal alkanes of from $C_{10}$–$C_{16}$. The petroleum cut should have at least about 10% by weight of normal alkanes. Usually, petroleum mixtures will have about 15 to 65% by volume of paraffins, of which about 10 to 80 volume percent will be normal paraffins (1.5–52 of the total). About 5 to 35% by volume are aromatic hydrocarbons and about 5 to 35% by volume are naphthenes. Also, unless efforts are made to remove these materials, there will usually be about up to 5% of compounds having oxygen, sulfur or nitrogen. Preferred feedstocks are those boiling in the range of about 405 to 480° F., that is, the range including normal alkanes of from $C_{11}$–$C_{14}$.

As already indicated, the sorbent material or molecular sieves are dehydrated zeolites having pore sizes of about 4.9 to about 5.5 A. Descriptions of various zeolites appear in U.S. Patent Nos. 2,306,610, 2,442,191, and 2,522,426, as well as an article by Breck et al., J. Am. Chem. Soc., 78, 5963 (1956). The sieves may be used in granular or powder form, or as extruded or spherical pellets, etc. They are readily available as granules in sizes of ⅛ and ¹⁄₁₆ inch or as pellets of various mesh sizes.

The purge gas is a normal alkane of from 5 to 9 carbons, i.e., pentane, hexane, heptane, octane, and nonane. Preferred as a purge gas is hexane. It is important that the purge gases have at least two ($C_{n-2}$) fewer carbons than the lowest carbon number of the desired normal alkanes. This is required for ease of separation.

The temperature at which the separation is carried out and at which materials are introduced into the separation zone is in the range of about 500° F. to 660° F., preferably 500° to 600° F. It is essential that the temperature be above the dew point of the feed. Variations of as much as 30° F. may result from the heat of adsorption when introducing the hydrocarbon mixture or from variations in the system. However, variations of ±20° F. will rarely be exceeded and to that degree the system is maintained isothermally. Of course, the temperature will be determined in part by the pressures, since all the materials must be maintained in the vapor phase. With increasing pressures, some increase in temperature will generally be required; however, the temperature must be maintained within the range indicated above.

Concerning the pressure, it is well known that increasing pressure results in increasing capacity of the molecular sieves. To that degree an increase in pressure is desirable. However, pressures above atmospheric require special equipment as well as higher temperatures to maintain the system in the vapor phase and, to that degree, are undesirable. Depending, therefore, on the particular advantage to be obtained, the pressure may be varied in the range of about 0–100 p.s.i.g., preferably from about 0–50 p.s.i.g., more preferred, 10–50 p.s.i.g. Irrespective of the desired pressure, the system is preferably maintained isobaric.

The amount of molecular sieve will usually be in the range of about 25 to 100 parts of sieve per part of normal alkane produced per cycle. Since only a portion of the column is used, that is, only from about 70 to 90%, larger amounts of molecular sieve will be required in the column. The amount of purge required is about 2 to 20 parts per part of adsorbate to be desorbed. Preferably, about 5 to 15 parts of purge will be used. Irrespective of the particular purging material within the indicated range, the same number of parts will be required.

The liquid hourly space velocity of the feed will generally be in the range of about 0.2 to 1.0, while the liquid hourly space velocity of the purge will usually be in the range of about 1.0 to 16.0. These velocities are necessary in order to maximize the efficient use of the column by having rapid adsorption and desorption.

When desorbing the $C_{10}$–$C_{16}$ normal alkanes from the molecular sieves, only about 10 to 75% of the adsorbed $C_{10}$–$C_{16}$ normal alkanes will be removed, preferably only about 15 to 65%.

The process can be conveniently carried out by using one or more columns packed with molecular sieves. Usually, it is preferred to have from 2 to 3 columns in order to permit the continual flow of materials. The following description of the process is illustrative of the use of two columns.

Two columns are packed with granular molecular sieves to a convenient height and heated to the desired temperature. At equilibrium, the column prior to introduction of the feed will be filled to some percent of its capacity. (When referring to percent capacity, only alkanes of $C_{10}$ or higher are considered.) The feed is preheated and introduced so that the column is maintained relatively isothermally. The rate of flow is sufficient to permit all of the normal alkanes of at least $C_{10}$ to be adsorbed, while being rapid enough to provide maximum use of the column. Sufficient feed is introduced so that the column is filled to only partial capacity, somewhere in the region of 70 to 90% of capacity. The flow of feed is then stopped.

Materials other than normal alkanes are present in the voids between the granular particles. For the high purity required, these materials are removed by a short initial purge with the purging gas. The purging of the voids may be cocurrent or countercurrent to the flow of the feed. If it is cocurrent with the feed, then the purge flows into the line with the raffinate and is combined with the raffinate, or preferably the purging gas raffinate is separated and the purging gas recycled. The lower boiling purge material can then be separated by distillation or other means from the raffinate. If it is countercurrent to the flow of the feed, the first portion of the purge is bled off and the purging gas-raffinate treated as described above.

A purge of the voids cocurrent with the feed has the advantage that the normal paraffins are not removed from the column. During the purge of the voids, the normal paraffins move up into the empty zone—free of $C_{10}$ or higher alkanes—at the top of the molecular sieve column. The countercurrent purge results in removal of some of the normal alkanes from the bottom of the column.

With countercurrent purging, normal alkanes are removed from the molecular sieves along with the isoparaffins in the same direction of the purging of the normal alkanes. Therefore, it is necessary to bleed off the first portion of the purge to prevent the contamination of the normal alkanes with the isoparaffins. The percent recovery of normal alkanes is a function of the desired purity; although by recycling of the bleed, recovery is increased while maintaining the desired purity.

If the purge is countercurrent with the feed, it is then continued until the desired amount of normal alkanes have been removed from the column. If the purge is cocurrent, the purge is stopped and the purging gas is passed countercurrently through the column until the desired amount of normal paraffins have been removed from the column. While the gases are flowing in one direction in one column, they are generally flowing in an opposite direction in the other column. In this manner, the hot effluent can be used to heat the cooler influent. Of course, external heat will have to be supplied to maintain the isothermal nature of the process.

The time for the flow in any one direction will usually be not more than 15 minutes and generally not more than 12 minutes. These times are found sufficient to adsorb the normal paraffins in the feed, and maximize the usefulness of the molecular sieves.

By carrying out the process as described, the amount of heat required to maintain the system is minimized, impurities in the normal alkanes are minimized, maximum use of the molecular sieves is achieved, and the lifetime of the molecular sieve is enhanced.

A preferred embodiment of the process is to hydrofine the feed prior to introducing it into the molecular sieve bed. Various methods are taught in the art for hydrofining. See, for example, U.S. Patent No. 3,102,853. The feed stream to be hydrofined is usually mixed with hydrogen and fed to the reactor. The precise conditions may vary widely depending on a particular feed stream. In general, the temperatures vary from about 550° F. to about 700–750° F. Pressures will vary up to about 800 pounds per square inch. The hydrogen partial pressure will vary with the composition of the feed. While a number of catalysts may be utilized from the hydrofining operation, preferred catalysts are cobalt molybdate on alumina, as well as molybdenum on alumina. Other catalysts, for example, activated alumina, may also be utilized. The hydrofined feed may then be fed directly into the molecular sieve column.

The following examples are offered by way of illustration and not by way of limitation.

*Example A*

A tube, 15 feet in length and 2 inches in diameter, was packed with 16 pounds of Linde 5A molecular sieves, $\frac{1}{16}$ inch diameter.

The following table indicates the results obtained under varying conditions using a Minas feed boiling in the range 405° F. to 480° F. and normal hexane (85%) as purge. The results are reported for the first day of use of the molecular sieves after regeneration.

TABLE I

|  | I | II | III |
|---|---|---|---|
| Cycle time, min.: |  |  |  |
| Feed | } 6.0 | 6.0 | 6.0 |
| Voids purge |  |  |  |
| Countercurrent purge | 6.0 | 6.0 | 6.0 |
| Total | 12.0 | 12.0 | 12.0 |
| Operating conditions: |  |  |  |
| Ave. bed temp., °F | 750 | 658 | 564 |
| Pressure, p.s.i.a.: |  |  |  |
| Feed | 30 | 30 | 30 |
| Countercurrent purge | 30 | 30 | 30 |
| Feed discription ($C_{11}$–$C_{14}$) | 653 | 685 | 697 |
| n-Paraffin, wt. percent | 38 | 41 | 41 |
| Rate, gms./cycle | 511 | 441 | 412 |
| Countercurrent purge | $C_6$ | $C_6$ | $C_6$ |
| Rate, gms./cycle | 1,516 | 1,565 | 1,550 |
| Stoichiometric front, ft | 11.3 | 11.3 | 10.4 |
| Sat'd. sieve, delta loading, lbs./100 lbs. sat. sieve | 3.58 | 3.34 | 3.36 |
| Overall recovery, wt. percent | 97.2 | 99.1 | 101.8 |
| Bromine No. of product* | n, 0.8 | n, 0.2 | n, 0.1 |
|  | i, 1.3 | i, 0.7 | i, 0.5 |

*Bromine number is the grams of bromine which react with 100 grams of sample.

n—normal paraffins; i—other than normal paraffins.

By using the process of this invention, good quality products are obtained, while at the same time achieving great advantages in efficiency and ease of operation. Lifetimes of the molecular sieves are increased and coking significantly diminished. Moreover, olefin in the raffinate is diminished.

As will be evident to those skilled in the art, various modifications on this process can be made or followed, in the light of the foregoing disclosure and discussion, without departing from the spirit or scope of the disclosure or from the scope of the following claims.

I claim:

1. A process for the isolation of high purity normal alkane of from $C_{10}$–$C_{16}$ (high alkane) performed at vapor phase conditions under relatively isothermal conditions in the range of 500 to 660° F. and relatively isobaric conditions in the range of 0 to 100 p.s.i.g.;

which comprises:

contacting in a separation zone a petroleum hydrocarbon feed boiling in the range of about 380 to 565° F. with molecular sieves having about a 5 A. pore size, said petroleum hydrocarbon being in an amount sufficient to fill the sieves from 70 to 90% of capacity, to obtain a raffinate relatively free of normal alkanes, purging cocurrently with a normal alkane (low alkane) of from 5 to 9 carbons having at least 2 fewer carbons than the lowest desired "high alkane" for a time sufficient to remove any non-adsorbed materials from the separation zone, purging countercurrently to the feed with "low alkane" for a time sufficient to remove from 10 to 75% of the adsorbed "high alkane" from the molecular sieves, and then isolating the "high alkane."

2. A process according to claim 1 wherein the temperature range for the process is 500–600° F. and the purging "low alkane" is hexane.

3. A method according to claim 2 wherein the liquid hourly space velocity of the feed will be in the range of about 0.2 to 1.0 and the liquid hourly space velocity of the purge will be in the range of about 1.0 to 16.0.

4. A process for the isolation of high purity normal alkanes performed at vapor phase conditions under relatively isothermal conditions in the range of 500 to 600° F. and relatively isobaric conditions in the range of 0 to 50 p.s.i.g.;

which comprises:

contacting in a separation zone with molecular sieves having about a 5 A. pore size at a liquid hourly space velocity in the range of about 0.2 to 1.0, a petroleum hydrocarbon feed boiling in the range of about 380 to 565° F. and having a substantial percentage of normal paraffins, with an amount of said feed sufficient to fill said molecular sieves to from 70 to 90% of capacity to obtain a raffinate relatively free of normal alkanes, purging said molecular sieves cocurrently with a purging gas, said purging gas being normal alkanes of from 5 to 9 carbons having at least two fewer carbons than the lowest desired alkane of from $C_{10}$–$C_{16}$, for a time sufficient to remove any non-adsorbed hydrocarbon, purging said molecular sieves countercurrently to the feed with said purging gas at a liquid hourly space velocity of 1 to 16 for a time sufficient to remove 15 to 65% of the $C_{10}$–$C_{16}$ normal alkanes from the molecular sieves, and then isolating the $C_{10}$–$C_{16}$ normal alkanes.

5. A method according to claim 4 wherein the pressure is in the range of about 10 to 50 p.s.i.g.

6. A method according to claim 5 wherein the time of flow in any one direction in one cycle does not exceed 15 minutes.

7. A method according to claim 4 wherein the desired normal alkanes are in the range of $C_{11}$–$C_{14}$.

8. A method according to claim 7 wherein the pressure is in the range of 10 to 50 p.s.i.g. and the purging gas is hexane.

9. A method according to claim 7 wherein the petroleum feed is hydrofined prior to use.

References Cited by the Examiner
UNITED STATES PATENTS

| | | | |
|---|---|---|---|
| 2,988,502 | 6/1961 | Ricards et al. | 208—310 |
| 2,988,577 | 6/1961 | Sensel | 208—310 |
| 3,184,406 | 5/1965 | Yeo et al. | 260—676 |

ALPHONSO D. SULLIVAN, *Primary Examiner.*